United States Patent Office 3,819,684
Patented June 25, 1974

3,819,684
SULFENYLATED N-METHYLCARBAMIC ACID ARYL ESTERS
Engelbert Kuhle, Bergisch-Gladbach, Erich Klauke, Odenthal-Hahnenberg, Ingeborg Hammann, Cologne, Brigitte Hamburger, Cologne-Duennwald, and Paul-Ernst Frohberger, Leverkusen, Germany, assignors to Bayer Aktiengesellschaft, Leverkusen, Germany
No Drawing. Filed Apr. 30, 1970, Ser. No. 33,505
Claims priority, application Germany, May 6, 1969,
P 19 22 929.9
Int. Cl. C07c 161/00
U.S. Cl. 260—479 C                 13 Claims

ABSTRACT OF THE DISCLOSURE

Sulfenylated N-methylcarbamic acid aryl esters, i.e. phenyl or substituted-phenyl esters of N-(methylthio)-N-methylcarbamic acid in which the methylthio group is substituted by three chlorine atoms or by two chlorine atoms and a fluorine atom, which possess insecticidal, acaricidal, fungicidal and microbicidal properties and which may be produced by conventional methods.

---

The present invention relates to and has for its objects the provision of particular new sulfenylated N-methylcarbamic acid aryl esters, i.e. phenyl or substituted-phenyl esters of N-(methylthio)-N-methylcarbamic acid in which the methylthio group is substituted by three chlorine atoms or by two chlorine atoms and a fluorine atom, which possess insecticidal, acaricidal, fungicidal and microbicidal properties, active compositions in the form of mixtures of such compounds with solid and liquid dispersible carrier vehicles, and methods for producing such compounds and for using such compounds in a new way especially for combating pests, e.g. arthropods, especially insects and acarids, fungi and microbes, with other and further objects becoming apparent from a study of the within specification and accompanying examples.

It is known that N-trichloromethylthio compounds display fungicidal and insecticidal properties (see German Pat. 921,290). Furthermore, it is known that N-fluorodichloromethylthio compounds may also be used as fungicides and acaricides (see Angewandte Chemie, Volume 76, 807 (1964)). Representatives of both classes of compounds, for example, N-(trichloromethylthio) - phthalimide and N,N - dimethyl - N'-phenyl-N'(fluorodichloromethylthio)-sulfonyldiamide have found acceptance in practice.

The present invention provides new N-sulfenylated N-methylcarbamic acid aryl esters of the formula

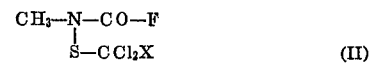

in which
X represents chlorine or fluorine, and
Ar represents a phenyl or naphthyl radical which may be substituted by at least one lower alkyl, alkoxy, alkylmercapto, dialkylamino, trifluoromethyl, halogen or nitro radical. Advantageously the alkyl and alkoxy radicals contain 1 to 4 and preferably 1 to 3 carbon atoms.

It has been found that compounds of the formula (I) defined above possess strong insecticidal, acaricidal, fungicidal and microbicidal properties.

The present invention also provides two processes for the production of the N-sulfenylated N-methylcarbamic acid aryl esters of the formula (I) in which (a) A N-sulfenylated N-methylcarbamic acid fluoride of the formula

in which X has the abovementioned significance, is reacted with a phenolic compound of the formula HO—Ar                 (III)

in which Ar has the abovementioned significance, in the presence of a diluent and an acid-binding agent, or (b) A N-sulfenylated N-methyl carbamic acid fluoride of the formula (II) as defined above is reacted with an alkali metal salt of a phenolic compound of the formula (III) as defined above, in the presence of a diluent.

It is surprising that the compounds according to the invention display a higher insecticidal, acaricidal and fungicidal strength than previously known N-trihalomethylthio compounds. The substances according to the invention thus represent an enrichment of the art.

The course of the reaction (a) can, when using N-(fluorodichloromethylthio) - N - methylcarbamic acid fluoride and phenol as starting substances, be represented by the following equation:

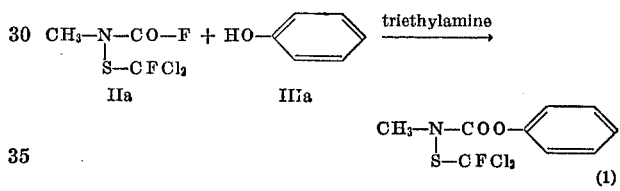

The N-sulfenylated N - methylcarbamic acid fluorides are known and are defined by formula (II). They are obtainable from N-methylcarbamic acid fluoride and an appropriate sulfenyl chloride in the presence of a tertiary amine (see Belgian Pat. 717,705).

The phenolic compounds required for the reaction are generally defined by the formula (III). In formulae (I) and (III), Ar represents a phenyl or naphthyl radical which may preferably be substituted by methyl, trifluoromethyl, ethyl, propyl, butyl, methoxy, ethoxy, propoxy, methylmercapto, dimethylamino, chlorine and/or the nitro group.

As phenolic compounds it is thus possible to use, phenol, cresols, xylenols, tert.-butylphenols, iso-propylphenols, dimethylaminophenols, chloro-, dichloro- and nitro-phenols, 2-chloro - 4 - nitrophenol, 2 - isopropoxyphenol, 2-ethoxyphenol, 3-methyl - 4 - methylmercaptophenol, 4-trifluoromethylphenol and naphthols for the process according to the invention. The phenols and naphthols mentioned are known.

Possible diluents are all inert organic solvents. These preferably include (optionally chlorinated) hydrocarbons, such as benzine, benzene, toluene, xylene, chlorobenzine as well as dichloromethane, dichloroethane, chloroform, carbon tetrachloride and the like, ethers, for example diethyl and dibutyl ether, dioxan; as well as low-boiling aliphatic ketones and nitriles, for example acetone, methylethyl ketone, methylisopropyl ketone, acetonitrile, propionitrile; and the like.

In order to bind the hydrogen fluoride produced during the reaction, an acid-binder, usually a tertiary base such as triethylamine, tributylamine, dimethyl benzylamine, pyridine, and the like, or an inorganic base such as an alkali hydroxide or alkali carbonate, is added to the reaction mixture. As mentioned above, it is possible to start directly from the alkali phenolates; it is also possible to carry out the reaction according to the invention in an aqueous phase.

The reaction temperatures can be varied over a fairly wide range and in general temperatures of 0° to 100° C., preferably of 20° to 40° C., are used.

In carrying out the process according to the invention, equimolar amounts of the reagents are generally used. In many cases it has also proved advantageous if the phenol component is employed in slight excess (for example about 5 to 20 percent by weight).

The reaction mixture is worked up in the usual manner.

The active substances according to the invention display strong insecticidal and acaricidal activity while possessing a low phytotoxicity. The active substances can therefore be used successfully for combating harmful sucking and biting insects, Diptera as well as mites (Acarina).

To the sucking insects contemplated herein there belong, in the main, aphids, such as the green peach aphid (Myzus persicae), the bean aphid (Doralis fabae); scales, such as Aspidiotus hederae, Lecanium hesperidum, Pseudococcus maritiums; Thysanoptera, such as Hercinothrips femoralis; and bugs, such as the beet bug (Piesma quadrata) and the bed bug (Cimex lectularius); and the like.

With the biting insects contemplated herein, there are classed, in the main, butterfly caterpillars, such as Plutella maculipennis, Lymantria dispar; beetles, such as granary weevils (Sitophilus granarius), the Colorado beetle (Leptiontarsa decemlineata), and also species living in the soil, such as the wireworms (Agriotes sp.) and larvae of the cockchafer (Melolontha melolontha); cockroaches, such as the German cockroach (Blattella germanica); Orthoptera, such as the house cricket (Gryllus domesticus); termites, such as Reticulitermes; Hymenoptera, such as ants; and the like.

The Diptera contemplated herein comprise, in particular, the flies, such as the vinegar fly (Drosophila melanogaster), the Mediterranean fruit fly (Ceratitis capitata), the house fly (Musca domestica), and mosquitoes, such as the yellow fever mosquito (Aedes aegypti); and the like.

In the case of the mites contemplated herein, particularly important are the spider mites (Tetranychidae) such as the two-spotted spider mite (Tetranychus urticae), the European red mite (Paratetranychus pilosus); gall mites, such as the currant gall mite (Eriophyes ribis) and tarsonemids, such as Tarsonemus pallidus, and ticks; and the like. The effects set in rapidly and are long-lasting.

The active substances according to the invention also show a strong fungitoxic action against phytopathogenic fungi. Their good compatibility with warm-blooded animals and higher plants permits them to be employed as plant protection agents against fungal diseases. They do not harm culture plants in the concentration required for combatting the fungi. Fungitoxic agents in plant protection are employed for combatting fungi from the most diverse classes of fungi, such as Archimycetes, Phycomycetes, Ascomycetes, Basidiomycetes and Fungi imperfecti.

The active substances according to the invention have a very broad spectrum of activity. They can be employed against parasitic fungi on parts of the plant which are above ground, against fungi which cause Tracheomycosis and which attack the plants from the soil, seed-borne fungi as well as fungi which inhabit soil.

The active substances are also highly effective and of particular practical importance if they are employed as seed disinfectants or soil treatment agents against phytopathogenic fungi, which adhere to the seed or occur in soil and cause diseases of seedlings, rotting of roots, Tracheomycoses, or diseases of the stem, stalk, leaf, blossom, fruit or seed, such as Tilletia caries, Helminthosporium gramineum, Fusarium nivale, Fusarium culmorum, Rhizoctonia solani, Phialophora cinerescens, Verticillum alboatrum, Fusarium solani, Sclerotinia sclerotiorum, Thielaviopsis basicola and Phytophthora cactorum.

The active compounds according to the instant invention can be utilized, if desired, in the form of the usual formulations or compositions with conventional inert (i.e. plant compatible or herbicidally inert) pesticide diluents or extenders, i.e. diluents or extenders of the type usable in conventional pesticide formulations or compositions, e.g. conventional pesticide dispersible carrier vehicles such as solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: inert dispersible liquid diluent carriers, including inert organic solvents, such as aromatic hydrocarbons (e.g. benzene, toluene, xylene, etc.), halogenated, especially chlorinated, aromatic hydrocarbons (e.g. chlorobenzenes, etc.), paraffins (e.g. petroleum fractions), chlorinated aliphatic hydrocarbons (e.g. methylene chloride, etc.), alcohols (e.g. menthanol, ethanol, propanol, butanol, etc.), amines (e.g. ethanolamine, etc.), ethers, ether-alcohols, (e.g. glycol monomethyl ethyl, etc.), amides (e.g. dimethyl formamide, etc.), sulfoxides (e.g. dimethyl sulfoxide, etc.), ketones (e.g. acetone, etc.), and/or water; as well as inert dispersible finely divided solid carriers, such as ground natural minerals (e.g. kaolins, alumina, silica, chalk, i.e. calcium carbonate, talc, kieselguhr, etc.) and ground synthetic minerals (e.g. highly dispersed silicic acid, silicate, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other acaricides and insecticides, or rodenticides, fungicides, herbicides, bactericides, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between 0.00001–20%, preferably 0.001–5%, by weight of the mixture. Thus, the present invention contemplates over-all compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.00001–95%, and preferably 0.01–95%, by weight of the mixture.

The active compounds can also be used in accordance with the well known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example airplane crop spraying techniques. Only up to at most about a few liters/hectare are needed, and often amounts only up to about 1 quart/acre, preferably 2–16 fluid ounces/acre, are sufficient. In this process it is possible to use highly concentrated liquid compositions with said liquid carrier vehicles containing from about 20 to about 98% by weight of active compound or even the 100% active substance alone.

In the treatment of seeds, amounts of active compound of 0.1 to 10 g., preferably 0.5 to 5 g., per kg. of seeds are in general required. Amounts of active compound of 1 to 500 g., preferably 10 to 200 g., per cubic meter of soil are required for the treatment of soil.

The active compounds according to the invention also possess nematocidal activity and rodent-repellent activity.

Furthermore, the present invention contemplates methods of selectively killing, combatting or controlling pests, e.g. arthropods, i.e. insects and acarids, as well as fungi and microbes, particularly methods of combatting such pests which comprises applying to at least one of correspondingly (a) such pests and (b) the corresponding habitat thereof, i.e. the locus to be protected, a correspondingly combative or toxic amount, i.e. an effective amount of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, and the like.

It will be realized, of course, that the concentration of the particular active compound utilized in admixture with the carrier vehicle will depend upon the intended application. Therefore, in special cases it is possible to go above or below the aforementioned concentration ranges.

The unexpected superiority and outsanding activity of the particular new compounds of the present invention are illustrated, without limitation, by the following examples:

EXAMPLE 1

Drosophila test

Solvent: 3 parts by weight of dimethylformamide
Emulsifier: 1 part by weight of alkylaryl polyglycol ether To produce a suitable preparation of the particular active compound, 1 part by weight of the active compound is mixed with the stated amount of solvent containing the stated amount of emulsifier, and the concentrate is diluted with water to the desired final concentration.

1 cc. of the preparation of the active compound is applied with a pipette to a filter paper disc of 7 cm. diameter. The wet disc is placed in a glass vessel containing 50 vinegar flies (*Drosophila melanogaster*) and covered with a glass plate.

After the specified periods of time, the destruction is determined as a percentage: 100% means that all the flies are killed; 0% means that none of the flies are killed.

The active compounds, their concentrations, the evaluation times and the degree of destruction can be seen from the following Table 1.

TABLE 1
(Insects which are harmful to plants)
*Drosophila test*

| Active compounds | Active compound concentration in percent | Degree of destruction in percent after 24 hours |
|---|---|---|
| (A) 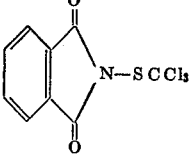 (known) | 0.2 | 0 |
| (1) 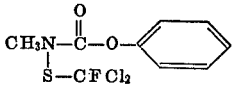 | 0.2 / 0.02 / 0.002 | 100 / 100 / 90 |
| (2) 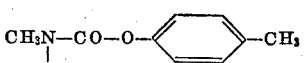 | 0.2 / 0.02 | 100 / 100 |
| (3) 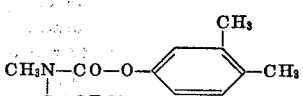 | 0.2 / 0.02 | 100 / 100 |
| (4) 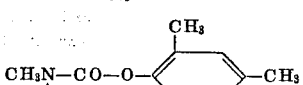 | 0.2 / 0.02 | 100 / 60 |
| (12) 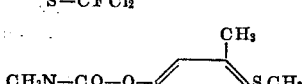 | 0.2 / 0.02 / 0.002 | 100 / 100 / 70 |
| (6) 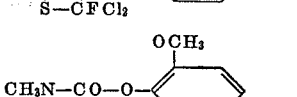 | 0.2 / 0.02 | 100 / 60 |
| (5) 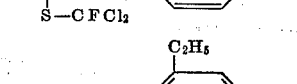 | 0.2 / 0.02 | 100 / 100 |
| (8) 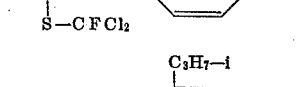 | 0.2 / 0.02 / 0.002 | 100 / 100 / 90 |
| (9) 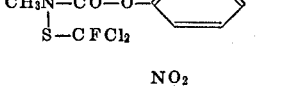 | 0.2 / 0.02 | 100 / 80 |
| (7) 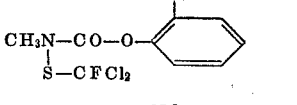 | 0.2 | 100 |
| (19) 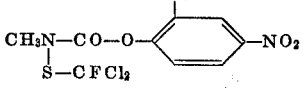 | 0.2 / 0.02 / 0.002 | 100 / 100 / 95 |
| (22) 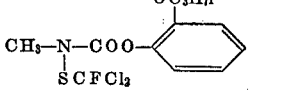 | 0.2 / 0.02 | 100 / 100 |
| (25) 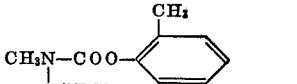 | 0.2 / 0.02 | 100 / 70 |

TABLE 1—Continued

| Active compounds | Active compound concentration in percent | Degree of destruction in percent after 24 hours |
|---|---|---|
| (26)  | 0.2 | 100 |
| (27)  | 0.2<br>0.02 | 100<br>98 |

EXAMPLE 2

Phaedon larvae test

Solvent: 3 parts by weight of dimethylformamide
Emulsifier: 1 part by weight alkylaryl polyglycol ether To produce a suitable preparation of the particular active compound, 1 part by weight of the active compound is mixed with the stated amount of solvent containing the stated amount of emulsifier, and the concentrate is diluted with water to the desired final concentration.

Cabbage leaves (*Brassica oleracea*) are sprayed with the preparation of the active compound until dripping wet and then infested with mustard beetle larvae (*Phaedon cochleariae*).

After the specified periods of time, the degree of destruction is determined as a percentage: 100% means that all the beetle larvae are killed, 0% means that none of the beetle larvae are killed.

The active compounds, the concentration of the active compounds, the times of evaluation and the results can be seen from the following Table 2:

TABLE 2
(Insects which are harmful to plants)
Phaedon larvae test

| Active compounds | Active compound concentration in percent | Degree of destruction in percent after 3 days |
|---|---|---|
| (A) 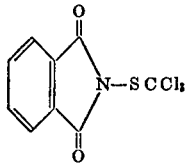<br>(known) | 0.2 | 0 |
| (3)  | 0.2<br>0.02 | 100<br>100 |
| (12)  | 0.2<br>0.02<br>0.002 | 100<br>100<br>100 |
| (13)  | 0.2<br>0.02 | 100<br>100 |
| (16)  | 0.2<br>0.02<br>0.002 | 100<br>100<br>90 |

TABLE 2—Continued

| Active compounds | Active compound concentration in percent | Degree of destruction in percent after 3 days |
|---|---|---|
| (17)  | 0.2<br>0.02 | 100<br>100 |
| (23)  | 0.2<br>0.02<br>0.002 | 100<br>100<br>90 |
| (24)  | 0.2<br>0.02<br>0.002 | 100<br>100<br>90 |
| (28)  | 0.2<br>0.02 | 100<br>100 |
| (29)  | 0.2<br>0.002<br>0.002 | 100<br>100<br>90 |

EXAMPLE 3

Plutella test

Solvent: 3 parts by weight of dimethylformamide
Emulsifier: 1 part by weight alkylaryl polyglycol ether To produce a suitable preparation of the particular active compound, 1 part by weight of the active compound is mixed with the stated amount of solvent containing the stated amount of emulsifier and the concentrate is diluted with water to the desired final concentration.

Cabbage leaves (*Brassica oleracea*) are sprayed with the prepraration of the active compound until dew moist and are then infested with caterpillars of the diamond-back moth (*Plutella maculipennis*).

After the specified periods of time, the degree of detruction is determined as a percentage: 100% means that all the caterpillars are killed whereas 0% means that none of the caterpillars are killed.

The active compounds, the concentrations of the active compounds, the evaluation times and the results can be seen from the following Table 3:

TABLE 3
(Insects which are harmful to plants)
Plutella test

| Active compounds | Active compound concentration in percent | Degree of destruction in percent after 3 days |
|---|---|---|
| (A) 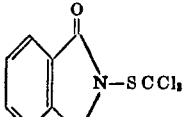<br>(known) | .02 | 0 |
| (15)  | 0.2<br>0.02 | 100<br>40 |

TABLE 3—Continued

| Active compounds | Active compound concentration in percent | Degree of destruction in percent after 3 days |
|---|---|---|
| (14) $CH_3N-\underset{\underset{S-CCl_3}{|}}{\overset{O}{\overset{||}{C}}}-O-\text{C}_6H_4(C_3H_7\text{-}i)$ | 0.2<br>0.02 | 100<br>100 |
| (16) $CH_3N-CO-O-\text{C}_6H_3(CH_3)(SCH_3)$, $S-CCl_3$ | 0.2<br>0.02 | 100<br>100 |
| (17) $CH_3N-CO-O-\text{naphthyl}$, $S-CCl_3$ | 0.2<br>0.02 | 100<br>70 |

EXAMPLE 4

Myzus test (contact action)

Solvent: 3 parts by weight dimethylformamide
Emulsifier: 1 part by weight alkylaryl polyglycol ether To produce a suitable preparation of the particular active compound, 1 part by weight of the active compound is mixed with the stated amount of solvent containing the stated amount of emulsifier and the concentrate is diluted with water to the desired final concentration.

Cabbage plants (*Brassica oleracea*) which have been heavily infested with peach aphids (*Myzus persicae*) are sprayed with the preparation of the active compound until dripping wet.

After destruction is determined as a percentage: 100% means that all the aphids are killed whereas 0% means that none of the aphids are killed.

The active compounds, the concentrations of the active compounds, the evaluation times and the results can be seen from the following Table 4:

TABLE 4
(Insects which are harmful to plants)
Myzus test

| Active compounds | Active compound concentration in percent | Degree of destruction in percent after 24 hours |
|---|---|---|
| (A) phthalimide-N-SCCl$_3$ (known) | 0.2 | 0 |
| (1) $CH_3N-\overset{O}{\overset{||}{C}}-O-\text{C}_6H_5$, $S-CFCl_2$ | 0.2 | 90 |
| (2) $CHN-CO-O-\text{C}_6H_4-CH_3$, $S-CFCl_2$ | 0.2 | 90 |
| (3) $CH_3N-CO-O-\text{C}_6H_3(CH_3)_2$, $S-CFCl_2$ | 0.2 | 100 |
| (4) $CH_3N-CO-O-\text{C}_6H_4-CH_3$, $S-CFCl_2$ | 0.2 | 100 |

TABLE 4—Continued

| Active compounds | Active compound concentration in percent | Degree of destruction in percent after 24 hours |
|---|---|---|
| (12) $CH_3N-CO-O-\text{C}_6H_3(CH_3)(SCH_3)$, $S-CFCl_2$ | 00.2<br>0.02 | 100<br>65 |
| (6) $CH_3N-CO-O-\text{C}_6H_4-OCH_3$, $S-CFCl_2$ | 0.2 | 98 |
| (8) $CH_3N-CO-O-\text{C}_6H_4(C_3H_7\text{-}i)$, $S-CFCl_2$ | 0.2<br>0.02 | 100<br>85 |
| (9) $CH_3N-CO-O-\text{C}_6H_4-NO_2$, $S-CFCl_2$ | 0.2 | 95 |
| (7) $CH_3N-CO-O-\text{C}_6H_3(NO_2)_2$, $S-CFCl_2$ | 0.2 | 100 |
| (13) $CH_3N-CO-O-\text{naphthyl}$, $S-CFCl_2$ | 0.2<br>0.02 | 95<br>70 |
| (15) $CH_3N-CO-O-\text{C}_6H_4-OCH_3$, $S-CCl_3$ | 0.2 | 100 |
| (14) $CH_3N-\overset{O}{\overset{||}{C}}-O-\text{C}_6H_4(C_3H_7\text{-}i)$, $S-CCl_3$ | 0.2<br>0.02 | 100<br>99 |
| (16) $CH_3N-CO-O-\text{C}_6H_3(CH_3)(SCH_3)$, $S-CCl_3$ | 0.2<br>0.02 | 100<br>30 |
| (17) $CH_3N-CO-O-\text{naphthyl}$, $S-CCl_3$ | 0.2<br>0.02 | 100<br>70 |
| (19) $CH_3-N-COO-\text{C}_6H_4-OC_3H_7\text{-}i$, $SCFCl_2$ | 0.2<br>0.02 | 100<br>100 |
| (23) $CH_3N-COO-\text{C}_6H_3(CH_3)(SCH_3)$, $SCFCl_2$ | 0.2<br>0.02<br>0.002 | 100<br>100<br>80 |
| (24) $CH_3N-COO-\text{C}_6H_3(CH_3)(N(CH_3)_2)$, $SCFCl_2$ | 0.2<br>0.02 | 100<br>100 |
| (29) $CH_3-N-COO-\text{C}_6H_2(CH_3)_2(SCH_3)$, $SCCl_3$ | 0.2<br>0.02<br>0.002 | 100<br>100<br>90 |

EXAMPLE 5

Tetranychus test

Solvent: 3 parts by weight dimethylformamide
Emulsifier: 1 part by weight alkylaryl polyglycol ether To produce a suitable preparation of active compound, 1 part by weight of the particular active compound is mixed with the stated amount of solvent containing the stated amount of emulsifier and the concentrate so obtained is diluted with water to the desired final concentration.

Bean plants (*Phaseolus vulgaris*), which have a height of approximately 10-30 cm., are sprayed with the preparation of the active compound until dripping wet. These bean plants are heavily infested with spider mites (*Tetranychus urticae*) in all stages of development.

After the specified periods of time, the effectiveness of the preparation of active compound is determined by counting the dead mites. The degree of destruction thus obtained is expressed as a percentage: 100% means that all the spider mites are killed whereas 0% means that none of the spider mites are killed.

The active compounds, the concentrations of the active compounds, the evaluation times and the results can be seen from the following Table 5:

TABLE 5
(Mites which are harmful to plants)
*Tetranychus urticae* test

| Active compounds | Active compound concentration in percent | Degree of destruction in percent after 48 hours |
|---|---|---|
| (A) 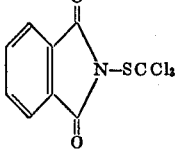 (known) | 0.2 | 0 |
| (B) 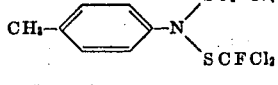 (known) | 0.2 | 0 |
| (1) 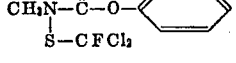 | 0.2<br>0.02 | 99<br>65 |
| (2) 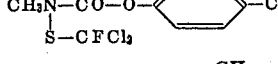 | 0.2<br>0.02 | 100<br>80 |
| (3) 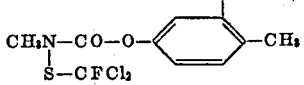 | 0.2<br>0.02 | 100<br>90 |
| (4) 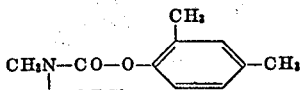 | 0.2<br>0.02 | 100<br>90 |
| (12) 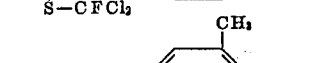 | 0.2<br>0.02 | 100<br>95 |
| (6) 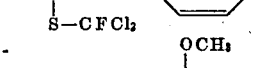 | 0.2<br>0.02 | 10<br>8 |
| (5) 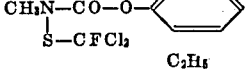 | 0.2<br>0.02 | 99<br>85 |
| (8) 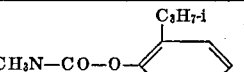 | 0.2<br>0.02 | 100<br>40 |
| (9) 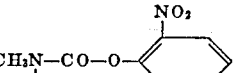 | 0.2<br>0.02 | 100<br>98 |
| (11) 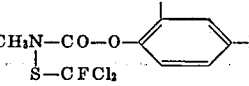 | 0.02 | 95 |
| (13) 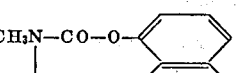 | 0.2<br>0.02 | 100<br>98 |
| (15)  | 0.2 | 100 |
| (14) 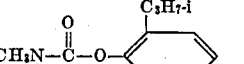 | 0.2 | 100 |
| (16) 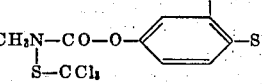 | 0.2 | 99 |
| (17) 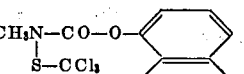 | 0.2 | 98 |
| (18) 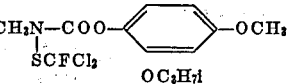 | 0.2<br>0.02 | 100<br>98 |
| (19) 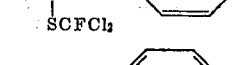 | 0.2<br>0.02 | 100<br>90 |
| (20) 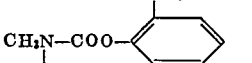 | 0.2 | 100 |
| (22) 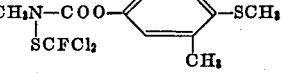 | 0.2<br>0.02 | 100<br>98 |
| (23) 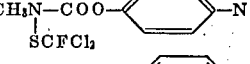 | 0.2<br>0.02<br>0.002 | 100<br>100<br>90 |
| (24) 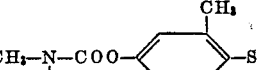 | 0.2<br>0.02 | 100<br>95 |
| (25)  | 0.2 | 100 |
| (29)  | 0.2<br>0.02 | 100<br>99 |

EXAMPLE 6

Soil treating agent test/soil-borne mycoses

To produce a suitable preparation of the particular active compound, the active compound is extended with talc to a content of 5% and subsequently with quartz sand to a content of 0.5% of active compound.

The preparation of the active compound is uniformly mixed with Fruhstorfer standard soil, which has first been sterilized and then inoculated with pure cultures of the test fungi.

The soil is filled into 5 pots, each of which is sown with 10 seeds of the host plants. The pots are placed in a greenhouse at the stated temperatures and kept normally moist.

3 weeks after sowing, the number of healthy plants is determined as a percentage of the number of seeds sown. 0% means that no healthy plants have grown; 100% means that healthy plants have resulted from all the seeds.

The active compounds, the concentrations of the active compounds in the soil, the test fungi, host plants, greenhouse temperatures and the results obtained can be seen from the following Table 6:

TABLE 6

Soil treating agent test/soil-borne mycoses
Test fungi: *Rhizoct. solami*
Host plant: Pea
Temperature range: 18–22°

| Active compounds | Active compound concentration in mg./liter of soil | |
|---|---|---|
| Fruhstorfer standard soil, sterilized—untreated | | 94 |
| Fruhstorfer standard soil, sterilized and inoculated—untreated | | 0 |
| (1) 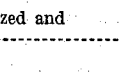 | 100 / 50 | 90 / 74 |
| (2) 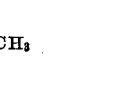 | 100 / 50 | 92 / 52 |
| (3) 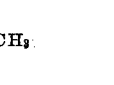 | 200 / 100 / 50 | 94 / 92 / 50 |
| (4) 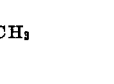 | 200 / 100 / 50 | 79 / 70 / 70 |
| (5)  | 100 / 50 | 86 / 68 |
| (8)  | 200 / 100 / 50 | 98 / 78 / 48 |
| (19)  | 100 | 35 |
| (22)  | 100 | 90 |
| (30) 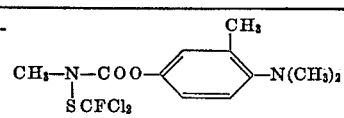 | 100 | 45 |
| Comparison agents: | | |
| (C) 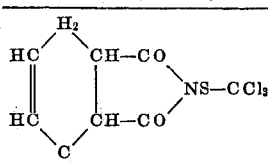 (known) | 500 / 200 / 100 / 50 | 72 / 49 / 24 / 18 |
| (A) 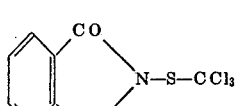 (known) | 500 / 100 | 94 / 54 |
| (D) 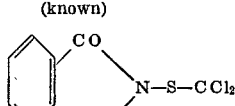 (known) | 500 / 100 | 50 / 12 |
| (E) 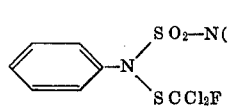 (known) | 500 / 200 / 100 / 50 | 50 / 46 / 16 / 10 |

EXAMPLE 7

Seed dressing test/soil-borne mycoses

To produce a suitable dry dressing, the particular active compound is extended with a mixture of equal parts by weight of talc and kieselguhr to give a finely powdered mixture with the desired concentration of active compound.

To apply the dressing, the seeds of suitable host plants are shaken with the dry dressing in a closed glass flask. Five batches of 10 grains of the seed are sown in pots which contain Fruhstorfer standard soil which has first been sterilized and then inoculated with pure cultures of the test fungi. The pots are placed in a greenhouse at the hereinafter-stated temperatures and are kept normally moist.

Three weeks after sowing, the number of healthy plants is determined as a percentage of the number of seeds sown. 0% means that no healthy plants have grown, whereas 100% means that healthy plants have resulted from all the seeds.

The active compounds, their concentrations in the dressing, the amounts of dressing used, test fungi, type of soil, host plants, greenhouse temperatures and the results obtained can be seen from the following Table 7:

TABLE 7

Seed dressing test/soil-borne mycoses
Test fungi: *Rhizoctonia solani*
Host plant: pea
Temperature range 18, 20° C.

| Active compounds | Active compound concentration in the dressing | Dressing/seed, g./kg. | |
|---|---|---|---|
| Fruhstorfer standard soil sterilized—without dressing | | | 90 |
| Fruhstorfer standard soil, sterilized and inoculated—without dressing | | | 18 |
| (4) $CH_3N-CO-O-\langle\text{phenyl-}CH_3\rangle-CH_3$, $S-CFCl_2$ | 30 | 4 | 76 |
| | 30 | 2 | 76 |
| | 10 | 2 | 54 |
| Comparison agent: | | | |
| (C) cyclohexene-dicarboximide $NS-CCl_3$ (known) | 80 | 2 | 34 |
| (A) phthalimide $N-S-CCl_3$ (known) | 50 | 2 | 24 |

TABLE 7—Continued

| Active compounds | Active compound concentration in the dressing | Dressing/seed, g./kg. | |
|---|---|---|---|
| (E) phenyl-N($SO_2-N-(CH_3)_2$)($SCCl_2F$) (known) | 80 | 2 | 26 |
| | 50 | 2 | 40 |

EXAMPLE 8

Seed dressing test/stripe disease of barley
(seed-borne mycosis)

To produce a suitable dry dressing, the particular active compound is extended with a mixture of equal parts by weight of talc and kieselguhr to give a finely powdered mixture with the desired final concentration of the active compound.

To apply the dressing, barley seed, which is naturally infested by *Helminthosporium gramineum*, is shaken with the dressing in a closed glass flask. The seed, on moist filter paper discs in closed Petri dishes, is exposed to a temperature of 4° C. for 10 days in a refrigerator. The germination of the barley, and possibly also of the fungus spores, is thereby initiated. Two batches of 50 grains of the pregerminated barley are subsequently sown 2 cm. deep in Fruhstorfer standard soil and cultivated in a greenhouse at temperatures of about 18° C. in seed boxes which are exposed to light for 16 hours daily. The typical symptoms of the stripe disease develop within 3 to 4 weeks.

After this time, the number of diseased plants is determined as a percentage of the total number of emerged plants. The fewer the plants which are diseased, the more effective is the active compound.

The active compounds, the concentration of the active compounds in the dressing, the amounts of dressing used and the number of diseased plants can be seen from the following Table 8:

TABLE 8

Seed dressing test/stripe disease of barley

| Active compound | Active compound concentration in the dressing, in percent | Amount of dressing used, in g./kg. of seed | Number of plants suffering from stripe disease, in percent of the total emerged plants |
|---|---|---|---|
| Without dressing | | | 60.6 |
| (1) $CH_3N-\overset{O}{\underset{S-CFCl_2}{C}}-O-\langle\text{phenyl}\rangle$ | 30 | 2 | 1.0 |
| | 10 | 2 | 1.0 |
| (2) $CH_3N-CO-O-\langle\text{phenyl}\rangle-CH_3$, $S-CFCl_2$ | 30 | 2 | 1.0 |
| (3) $CH_3N-CO-O-\langle\text{phenyl-}CH_3\rangle-CH_3$, $S-CFCl_2$ | 30 | 2 | 3.2 |
| (4) $CH_3N-CO-O-\langle\text{phenyl-}CH_3\rangle-CH_3$, $S-CFCl_2$ | 30 | 2 | 1.1 |
| (5) $CH_3N-CO-O-\langle\text{phenyl-}C_2H_5\rangle$, $S-CFCl_2$ | 30 | 2 | 4.1 |

TABLE 8—Continued

| Active compound | Active compound concentration in the dressing, in percent | Amount of dressing used, in g./kg. of seed | Number of plants suffering from stripe disease, in percent of the total emerged plants |
|---|---|---|---|
| (6) $CH_3N-CO-O-\langle\text{phenyl}\rangle-OCH_3$ (ortho), $S-CFCl_2$ | 30 | 2 | 1.0 |
| (B) $CH_3N-CO-O-\langle\text{phenyl}\rangle-C_3H_7\text{-i}$, $S-CFCl_2$ | 30 | 2 | 0.0 |
| Comparison agent: | | | |
| (C) tetrahydrophthalimide-$NS-CCl_3$ (known) | 30 | 2 | 62.0 |
| | 10 | 2 | 57.2 |
| (D) phthalimide-$N-S-CCl_2F$ (known) | 30 | 2 | 15.6 |
| | 10 | 2 | 15.2 |
| (E) $\langle\text{phenyl}\rangle-N(SO_2-N(CH_3)_2)(SCCl_2F)$ (known) | 30 | 2 | 24.0 |
| (B) $CH_3-\langle\text{phenyl}\rangle-N(SO_2-N(CH_3)_2)(SCFCl_2)$ (known) | 30 | 2 | 45.6 |
| (18) $CH_3N-COO-\langle\text{phenyl}\rangle-OCH_3$, $SCFCl_2$ | 30 | 2 | 12.1 |
| (19) $CH_3-N-COO-\langle\text{phenyl}\rangle-OC_3H_7\text{-i}$, $SCFCl_2$ | 10 | 2 | 10.2 |
| (22) $CH_3N-COO-\langle\text{phenyl}\rangle-CH_3$, $SCFCl_2$ | 10 | 2 | 7.4 |

EXAMPLE 9

Seed dressing test/bunt of wheat (seed-borne mycoses)

To produce a suitable dry dressing, the particular active compound is extended with a mixture of equal parts by weight of talc and kieselguhr to give a finely powdered mixture with the desired final concentration of the active compound.

Wheat seed is contaminated with 5 g. of the chlamydospores of *Tilletia caries* per kg. of seed. To apply the dressing, the seed is shaken with the dressing in a closed glass flask. The seed, on moist loam under a cover of a layer of muslin and 2 cm. of moderately moist compost soil, is exposed to optimum germination conditions for the spores for 10 days at 10° C. in a refrigerator.

The germination of the spores on the wheat grains, each of which is contaminated with about 100,000 spores, is subsequently determined microscopically. The smaller the number of spores which have germinated, the more effective is the active compound.

The active compounds, the concentrations of the active compounds in the dressing, the amounts of dressing used and the percentage spore germination can be seen from the following Table 9:

TABLE 9
Seed dressing test/bunt of wheat

| Active compounds | Active compound concentration in dressing, in percent | Amount of dressing used, in g./kg. of seed | Spore germination, in percent |
|---|---|---|---|
| Without dressing | | | 10 |
| (3) CH₃N—CO—O—⟨C₆H₃(CH₃)(CH₃)⟩ / S—CFCl₂ | 30 | 1 | 0.05 |
| (6) CH₃N—CO—O—⟨C₆H₄(OCH₃)⟩ / S—CFCl₂ | 30 | 1 | 0.05 |
| (9) CH₃N—CO—O—⟨C₆H₄(NO₂)⟩ / S—CFCl₂ | 30 / 10 | 1 / 1 | 0.005 / 0.05 |
| (10) CH₃N—CO—O—⟨C₆H₄(NO₂)⟩ / S—CFCl₂ | 30 | 1 | 0.05 |
| (13) CH₃N—CO—O—⟨naphthyl⟩ / S—CFCl₂ | 30 | 1 | 0.005 |
| (11) CH₃N—CO—O—⟨C₆H₃(Cl)(NO₂)⟩ / S—CFCl₂ | 30 / 10 / 3 | 1 / 1 / 1 | 0.000 / 0.000 / 0.005 |
| (12) CH₃N—CO—O—⟨C₆H₃(CH₃)(SCH₃)⟩ / S—CFCl₂ | 30 | 1 | 0.05 |
| (18) CH₃N—COO—⟨C₆H₄(OCH₃)⟩ / SCFCl₂ | 30 | 1 | 0.05 |

EXAMPLE 10
Agar plate test

Test for fungitoxic effectiveness and breadth of the activity spectrum.

Solvent: Acetone
Parts by weight: (a) 1000, (b) 100

To produce a suitable preparation of the particular active compound, 1 part by weight of the active compound is taken up in the stated amount of solvent.

The preparation of the active compound is added to potato dextrose agar (which has been liquefied by heating) in such an amount that the desired concentration of active compound is set up therein. After thorough shaking to achieve a uniform dispersion of the active compound, the agar is poured into Petri dishes under sterile conditions. When the mixture of substrate and active compound has solidified, test fungi from pure cultures are inoculated on to it in small discs of 5 mm diameter. The Petri dishes remain at 20° C. for 3 days for incubation.

After this time, the inhibiting action of the active compound on the mycelium growth is determined in categories, taking into account the untreated control. 0 means no mycelium growth, either on the treated substrate or on the inoculum; the symbol — means mycelium growth on the inoculum only, no spread to the treated substrate; and the symbol + means mycelium growth from the inoculum on to the treated substrate, similar to the spread to the untreated substrate of the control.

The active compounds, the concentration of the active compounds, the test fungi and the inhibition effects achieved can be seen from the following Table 10.

TABLE 10

Agar plate test

| Active compound | | Active compound concentration in the substrate, in p.p.m. | Corticium rolfsii | Sclerotinia sclerotiorum | Virticillium alboatrum | Thielaviopsis basicola | Phytophthora cactorum | Fusarium culmorum | Fusarium oxysporum | Fusarium solan if. pisi |
|---|---|---|---|---|---|---|---|---|---|---|
| Untreated | | | + | + | + | + | + | + | + | + |
| (7) | 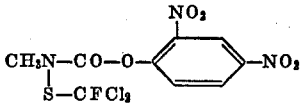 | 10<br>100 | 0<br>0 | –<br>0 | +<br>0 | 0<br>0 | 0<br>0 | 0<br>0 | 0<br>0 | +<br>0 |
| (18) | 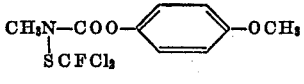 | 10<br>100 | 0<br>0 | 0<br>0 | +<br>0 | 0<br>0 | 0<br>0 | –<br>0 | 0<br>0 | +<br>+ |
| (19) | 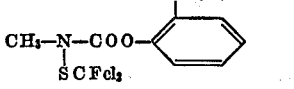 | 10<br>100 | 0<br>0 | +<br>0 | +<br>+ | 0<br>0 | 0<br>0 | +<br>0 | +<br>0 | +<br>+ |
| (22) | 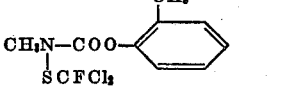 | 10<br>100 | 0<br>0 | 0<br>0 | +<br>0 | +<br>0 | 0<br>0 | +<br>0 | +<br>0 | +<br>0 |
| (30) | 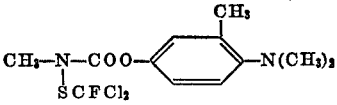 | 10<br>100 | 0<br>0 | +<br>0 | +<br>0 | –<br>– | 0<br>0 | +<br>0 | +<br>0 | +<br>0 |

The compounds (1), (2), (3) and (6) also show good activity as microbiocides against gram-negative and against gram-positive bacteria, mould fungi and yeasts.

EXAMPLE 11

Natural tanning solutions, which are very prone to attack by fungi, were protected against fungal growth by adding the compounds (1), (2), (3) or (6), even in high dilution.

The action of the compounds surpasses the o-hydroxydiphenyls which are extensively employed for such preservation. At concentrations of 0.05% no fungal growth occurs, as against the customary addition of 1% of o-hydroxydiphenyl to prevent fungal growth.

EXAMPLE 12

In order to prevent fungal attack in wood pulp stored while moist, an 0.05% strength solution of the compounds (1), (2), (3) or (6) in ethylene glycol is applied to the material. With this application, relative to dry substance, no fungus formation occurs.

EXAMPLE 13

Critical concentration test

Test nematode: *Phorbia brassicae* (nematodes in the soil)
Solvent: 3 parts by weight actone
Emulsifier: 1 part by weight alkyl aryl polyglycol ether To produce a suitable prepartion of the particular active compound, 1 part by weight of the active compound is mixed with the stated amount of solvent, the stated amount of emulsifier is added and the concentrate is diluted with water to the desired final concentration.

The preparation of active compound is intimately mixed with soil which is heavily infested with the test nematodes. The concentration of the active compound in the preparation is of practically no importance; only the amount of active compound per unit volume of soil, which is given in p.p.m., is decisive. The soil is filled into pots, lettuce is sown in the pots and they are kept at a greenhouse temperature of 27° C. After 4 weeks, the lettuce roots are examined for infestation with nematodes, and the degree of effectiveness of the active compound is determined as a percentage. The degree of effectiveness is 100% when infestation is completely avoided; it is 0% when the infestation is exactly the same as in the case of the control plants in untreated soil which has been infested in the same manner.

The active compounds, the amounts applied and the results can be seen from the following Table 13:

TABLE 13

(Soil insecticides)

*Pharbia brassicae* (nematodes in the soil)

| Active compound (constitution) | | Degree of destruction at a concentration of active compound in p.p.m. of— | | | |
|---|---|---|---|---|---|
| | | 20 | 10 | 5 | 2.5 |
| (F) | 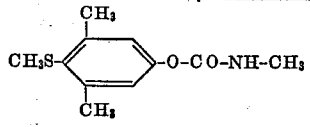<br>(known) | 100 | 50 | 0 | 0 |
| (19) | 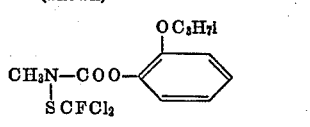 | 100 | 100 | 100 | 50 |
| (27) | 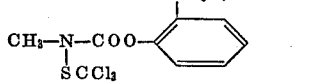 | 100 | 100 | 95 | 0 |

EXAMPLE 14

$LD_{100}$ test

Test insects, *Sitophilus granarius*
Solvent: acetone

Two parts by weight of the particular active compound are dissolved in 1000 parts by volume of the solvent. The solution so obtained is diluted with further solvent to the desired lower concentrations.

2.5 ml. of each solution of the active compound are pipetted into a separate Petri dish. On the bottom of each Petri dish there is a filter paper with a diameter of about 9.5 cm. The Petri dish remains uncovered until the solvent has completely evaporated. The amount of the active compound per square meter of filter paper varies with the concentration of the solution of active compound used. About 25 test insects are then placed in each Petri dish and it is covered with a glass lid.

The condition of the test insects is observed after 1 and 3 days after the commencement of the experiments. The knock down effect is determined as a percentage.

The active compounds, the concentrations of the active compounds, the test insects and the results can be seen from the following Table 14:

TABLE 14
LD$_{100}$ test

| Active compound (constitution) | Concentration of active compound of the solution, in percent | Killing rate in percent |
|---|---|---|
| (G) 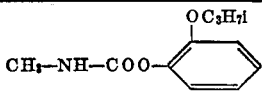 (known) | 0.2<br>0.04<br>0.008 | 100<br>100<br>100 |
| (C) 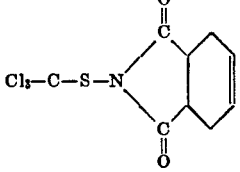 (known) | 0.2 | 0 |
| (A) 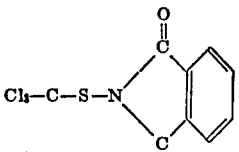 (known) | 0.2 | 10 |
| (19) 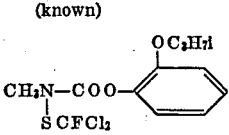 | 0.2<br>0.04<br>0.008 | 100<br>100<br>100 |
| (27) 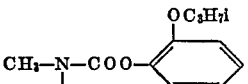 | 0.2<br>0.04<br>0.008<br>0.0016 | 100<br>100<br>100<br>30 |

EXAMPLE 15

LD$_{100}$ test

Test insects: *Leucophaea madeirae*
Solvents: acetone 2 parts by weight of the particular active compound are dissolved in 1000 parts by volume of the solvent. The solution so obtained is diluted with further solvent to the desired lower concentrations.

2.5 ml. of each solution of the active compound are pipetted into a separate Petri dish. On the bottom of the Petri dish there is a filter paper with a diameter of about 9.5 cm. The Petri dish remains uncovered until the solvent has completely evaporated. The amount of active compound per square meter of filter paper varies with the concentration of the solution of active compound used. About 25 test insects are then placed in the Petri dish and it is covered with a glass lid.

The condition of the test insects is observed after 1 and 3 days after the commencement of the experiments. The knock down effect is determined as a percentage.

The active compounds, the concentrations of the active compounds, the test insects and the results can be seen from the following Table 15:

TABLE 15
LD$_{100}$ test

| Active compound (constitution) | Concentration of active compound of the solution, in percent | Killing rate, in percent |
|---|---|---|
| (G) 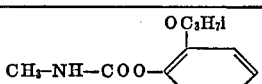 (known) | 0.2<br>0.04<br>0.008<br>0.0016 | 100<br>100<br>100<br>0 |
| (A) 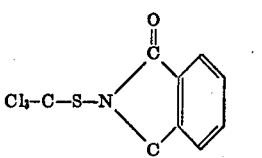 (known) | 0.2 | 0 |
| (C) 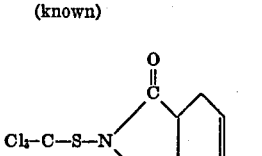 (known) | 0.2 | 0 |
| (19) 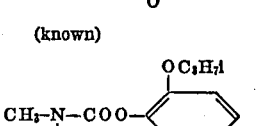 | 0.2<br>0.04<br>0.008<br>0.0016 | 100<br>100<br>100<br>100 |
| (27) 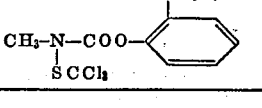 | 0.2<br>0.04<br>0.008<br>0.0016 | 100<br>100<br>100<br>80 |

EXAMPLE 16

LT$_{100}$ test for *Diptera*

Test insects: *Musca domestica*
Solvent: acetone 2 parts by weight of the particular active compound are dissolved in 1000 parts by volume of the solvent. The solution so obtained is diluted with further solvent to the desired lower concentrations.

2.5 ml. of each solution of the active compound are pipetted into a separate Petri dish. On the bottom of the Petri dish there is a filter paper with a diameter of about 9.5 cm. The Petri dish remains uncovered until the solvent has completely evaporated. The amount of active compound per square meter of filter paper varies with the concentration of the solution of the active compound used. About 25 test insects are then placed in the Petri dish and it is covered with a glass lid.

The condition of the test insects is continuously observed. The time which is necessary for a 100% knock down effect is determined.

The test insects, the active compounds, the concentrations of the active compounds and the periods of time at which there is a 100% knock down effect can be seen from the following Table 16:

TABLE 16
LT$_{100}$ test for *Diptera*

| Active compound (constitution) | Concentration of active compound of the solution, in percent | LT$_{100}$ in minutes (') or hours (h) |
|---|---|---|
| (C) Cl$_3$C—S—N(phthalimide structure, known) | 0.2 | 8h=0 |
| (A) Cl$_3$C—S—N(tetrahydrophthalimide structure, known) | 0.2 | 8h=0 |
| (19) CH$_3$—N(SCFCl$_2$)—C(O)—O—C$_6$H$_4$—OC$_3$H$_7$i | 0.2<br>0.04<br>0.008 | 45'<br>60'<br>5h=90% |
| (27) CH$_3$—N(S—CCl$_3$)—C(O)—O—C$_6$H$_4$—OC$_3$H$_7$i | 0.2<br>0.04 | 60'<br>4h |
| (23) CH$_3$—N(SCFCl$_2$)—C(O)—O—C$_6$H$_2$(CH$_3$)$_2$—SCH$_3$ | 0.2<br>0.04 | 60'<br>180' |

EXAMPLE 17

LT$_{100}$ test for *Diptera*

Test insects: *Aedes aegypti*
Solvent: acetone 2 parts by weight of the particular active compound are dissolved in 1000 parts by volume of the solvent. The solution so obtained is diluted with further solvent to the desired lower concentrations.

2.5 ml. of each solution of the active compound are pipetted into a separate Petri dish. On the bottom of the Petri dish there is a filter paper with a diameter of about 9.5 cm. The Petri dish remains uncovered until the solvent has completely evaporated. The amount of active compound per square meter of filter paper varies with the concentration of the solution of the active compound used. About 25 test insects are then placed in the Petri dish and it is covered with a glass lid.

The condition of the test insects is continuously observed. The time which is necessary for a 100% knock down effect is determined.

The test insects, the active compounds, the concentrations of the active compounds and the periods of time at which there is a 100% knock down effect can be seen from the following Table 17:

TABLE 17
LT$_{100}$ test for *Diptera*

| Active compound (constitution) | Concentration of active compound of the solution, in percent | LT$_{100}$ in minutes (') or hours (h) |
|---|---|---|
| (G) CH$_3$—NH—COO—C$_6$H$_4$—OC$_3$H$_7$i (known) | 0.2<br>0.04<br>0.008<br>0.0016 | 30'<br>30'<br>75'<br>6h=50% |
| (C) Cl$_3$C—S—N(phthalimide structure, known) | 0.2 | 8h=0% |

TABLE 17—Continued

| Active compound (constitution) | Concentration of active compound of the solution, in percent | LT₁₀₀ in minutes (') or hours (ʰ) |
|---|---|---|
| (A) 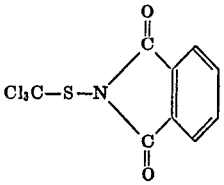 (known) | 0.2 | 8ʰ=0% |
| (19) 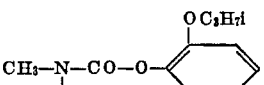 | 0.2<br>0.04<br>0.008<br>0.0016<br>0.00032<br>0.000064 | 30'<br>30'<br>30'<br>90'<br>180'<br>5ʰ=20% |
| (27) 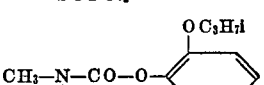 | 0.2<br>0.04<br>0.008<br>0.0016<br>0.00032 | 30'<br>30'<br>60'<br>105'<br>5ʰ=50% |

The following further examples are set forth to illustrate, without limitation, the process for producing the active compounds according to the present invention:

EXAMPLE 18

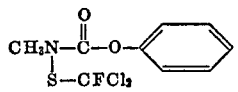

10.5 g. (0.05 mol) of N-(fluorodichloromethylthio)-N-methylcarbamic acid fluoride and 5 g. (0.055 mol) of phenol are dissolved in 50 ml. of dioxane. 5.5 g. (0.055 mol) of triethylamine are added dropwise at room temperature and the temperature is allowed to rise to 30° C. Thereafter the reaction solution is introduced into water and the oil is taken up in toluene. After drying and evaporating the toluene, distillation yields 9 g. of the above compound of boiling point 109–110° C./0.45 mm. Hg.

The following compounds are obtained analogously:

(2) N-(fluorodichloromethylthio) - methylcarbamic acid 4-methylphenyl ester

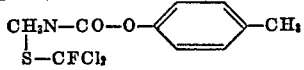

boiling point 114–120° C./0.45

(3) N-(fluorodichloromethylthio) - N - methylcarbamic acid 3,4-dimethylphenyl ester

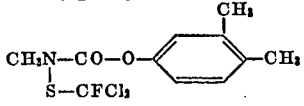

boiling point 129–131° C./0.42

(4) (fluorodichloromethylthio) - N - methylcarbamic acid 2,4-dimethylphenyl ester

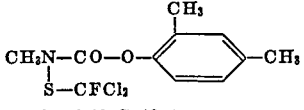

boiling point 120–126° C./0.4

(5) N-(fluorodichloromethylthio) - N - methylcarbamic acid 2-ethylphenyl ester

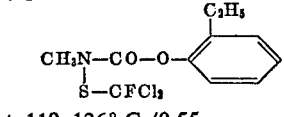

boiling point 119–126° C./0.55

(6) N-(fluorodichloromethylthio) - N - methylcarbamic acid 2-methoxyphenyl ester

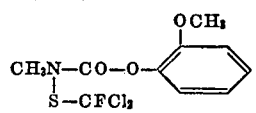

boiling point 133–137° C./0.55

(7) N-(fluorodichloromethylthio) - N - methylcarbamic acid 2,4-dinitrophenyl ester

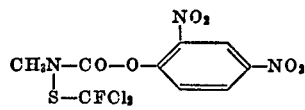

viscous oil $n_D^{20}$=1.5038

(8) N-(fluorodichloromethylthio) - N - methylcarbamic acid 2-isopropylphenyl ester

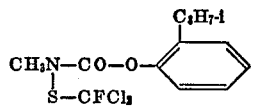

boiling point 123–126° C./0.55

(9) N-(fluorodichloromethylthio) - N - methylcarbamic acid 2-nitrophenyl ester

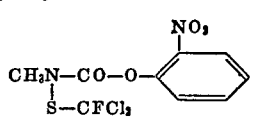

boiling point 162–169° C./0.55

(10) N-(fluorodichloromethylthio) - N - methylcarbamic acid 3-nitrophenyl ester

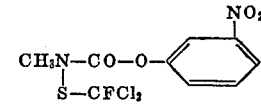

boiling point 159–163° C./0.55

(11) N-(fluorodichloromethylthio) - N - methylcarbamic acid 2-chloro-4-nitrophenyl ester

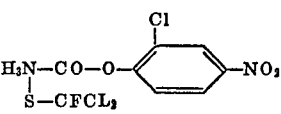

boiling point 166–169° C./0.4

(12) N-(fluorodichloromethylthio) - N - methylcarbamic acid 3-methyl-4-methylmercaptophenyl ester

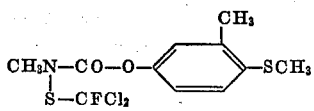

boiling point 160–164° C./0.4

(13) N-(fluorodichloromethylthio) - N - methylcarbamic acid naphthyl ester

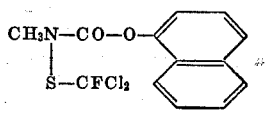

boiling point 163–169° C./0.55

EXAMPLE 19

(14)

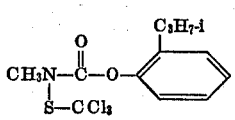

23 g. (0.1 mol) of N-(trichloromethylthio)-N-methylcarbamic acid fluoride are dissolved in 100 ml. of toluene with the addition of 13.5 g. (0.1 mol) of 2-isopropylphenol and mixed with 12 g. of triethylamine at room temperature, whereupon the temperature rises to 35° C. The solution is extracted by shaking with water, dried and concentrated *in vacuo*. Subsequent distillation yields 23 g. of the above compound of boiling point 148–155° C./0.55 mm.Hg.

The following are obtained in the same manner:

(15) N-(trichloromethylthio) - N - methylcarbamic acid 2-methoxyphenyl ester

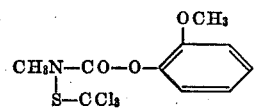

boiling point 155–161° C./0.45

(16) N-(trichloromethylthio) - N - methylcarbamic acid 3-methyl-4-methylmercaptophenyl ester

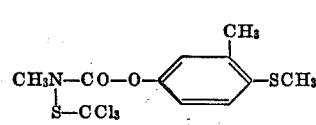

boiling point 216–220° C./1.3

(17) N-(trichloromethylthio) - N - methylcarbamic acid naphthyl ester

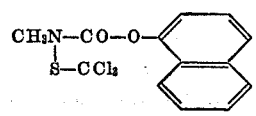

boiling point 206–211° C./0.55

(18) N-(fluorodichloromethylthio) - N - methylcarbamic acid 4-methoxyphenyl ester

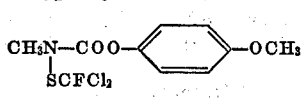

melting point 48–51° C.

(19) N-(fluorodichloromethylthio) - N - methylcarbamic acid 2-isopropoxyphenyl ester

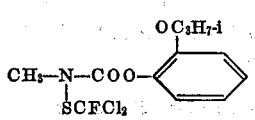

boiling point 124–128° C./0.05

(20) N-(fluorodichloromethylthio) - N - methylcarbamic acid 4-tert.-butylphenyl ester

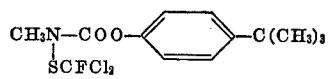

boiling point 160–162° C./0.2

(21) N-(fluorodichloromethylthio) - N - methylcarbamic acid 2,4-dichlorophenyl ester

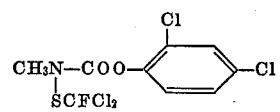

boiling point 129–133° C./0.04

(22) N-(fluorodichloromethylthio) - N - methylcarbamic acid 2-methylphenyl ester

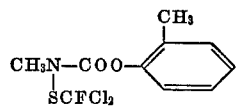

boiling point 110–115° C./0.09

(23) N-(fluorodichloromethylthio)-N-methylcarbamic acid 3,5-dimethyl-4-methylmercaptophenyl ester

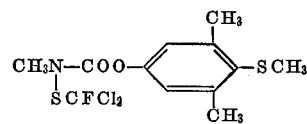

boiling point 150–154° C./0.03

(24) N-(fluorodichloromethylthio)-N-methylcarbamic acid 3-methyl-4-dimethylaminophenyl ester

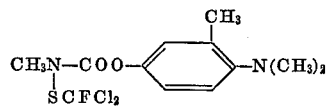

boiling point 138–145° C./0.04

(25) N-trichloromethylthio)-N-methylcarbamic acid phenyl ester

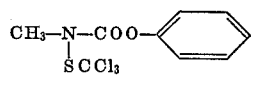

boiling point 120–125° C./0.04

(26) N-(trichloromethylthio)-N-methylcarbamic acid 4-methylphenyl ester

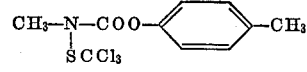

boiling point 130–135° C./0.03

(27) N-(trichloromethylthio)-N-methylcarbamic acid 2-isopropoxyphenyl ester

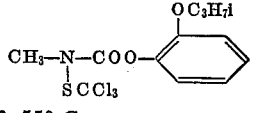

melting point 53–55° C.

(28) N-(trichloromethylthio)-N-methylcarbamic acid 3,4-dimethylphenyl ester

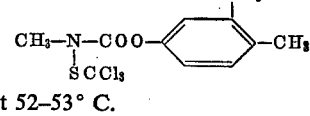

melting point 52–53° C.

(29) N-(trichloromethylthio)-N-methylcarbamic acid 3,5-dimethyl-4-methylmercaptophenyl ester

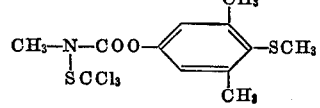

boiling point 178–183° C./0.04

(30) N-(fluorodichloromethylthio)-N-methylcarbamic acid 3-methyl-4-dimethylaminophenyl ester

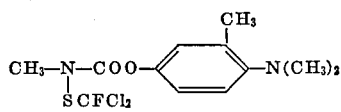

boiling point 138–145° C./0.04

It will be appreciated that the instant specification and examples are set forth by way of illustration and not limitation, and that various modifications and changes may be made without departing from the spirit and scope of the present invention.

What is claimed is:

1. A N-sulfenylated N-methylcarbamic acid aryl ester selected from the group consisting of:
   N - (fluorodichloromethylthio)-N-methylcarbamic acid phenyl ester;
   N - (fluorodichloromethylthio)-N-methylcarbamic acid 4-methylphenyl ester;
   N - (fluorodichloromethylthio)-N-methylcarbamic acid 3,4-dimethylphenyl ester;
   N - (fluorodichloromethylthio)-N-methylcarbamic acid 2,4-dimethylphenyl ester;
   N - (fluorodichloromethylthio)-N-methylcarbamic acid 2-isopropylphenyl ester;
   N - (fluorodichloromethylthio)-N-methylcarbamic acid 3-methyl-4-methylmercaptophenyl ester;
   N - (fluorodichloromethylthio)-N-methylcarbamic acid 4-methoxyphenyl ester;
   N - (fluorodichloromethylthio)-N-methylcarbamic acid 2-isopropoxyphenyl ester;
   N - (fluorodichloromethylthio)-N-methylcarbamic acid 2-methylphenyl ester;
   N - (fluorodichloromethylthio)-N-methylcarbamic acid 3,5-dimethyl-4-methylmercaptophenyl ester; and
   N - (fluorodichloromethylthio)-N-methylcarbamic acid 3-methyl-4-dimethylaminophenyl ester.

2. Compound according to claim 1 wherein such compound is N-(fluorodichloromethylthio)-N-methylcarbamic acid phenyl ester of the formula

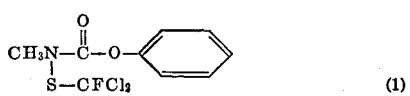 (1)

3. Compound according to claim 1 wherein such compound is N-(fluorodichloromethylthio)-N-methylcarbamic acid 4-methylphenyl ester of the formula

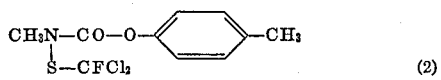 (2)

4. Compound according to claim 1 wherein such compound is N-(fluorodichloromethylthio)-N-methylcarbamic acid 3,4-dimethylphenyl ester of the formula

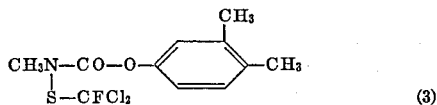 (3)

5. Compound according to claim 1 wherein such compound is N-(fluorodichloromethylthio)-N-methylcarbamic acid 2,4-dimethylphenyl ester of the formula

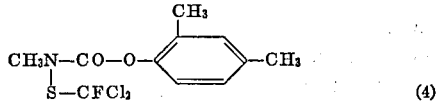 (4)

6. Compound according to claim 1 wherein such compound is N-(fluorodichloromethylthio)-N-methylcarbamic acid 2-isopropylphenyl ester of the formula

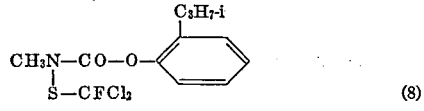 (8)

7. Compound according to claim 1 wherein such compound is N-(fluorodichloromethylthio)-N-methylcarbamic acid 3-methyl-4-methylmercaptophenyl ester of the formula

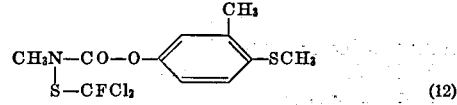 (12)

8. Compound according to claim 1 wherein such compound is N-(fluorodichloromethylthio)-N-methylcarbamic acid 4-methoxyphenyl ester of the formula

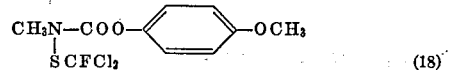 (18)

9. Compound according to claim 1 wherein such compound is N-(fluorodichloromethylthio)-N-methylcarbamic acid 2-isopropoxyphenyl ester of the formula

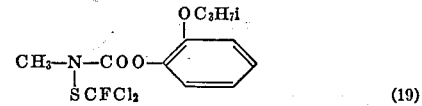 (19)

10. Compound according to claim 1 wherein such compound is N-(fluorodichloromethylthio)-N-methylcarbamic acid 2-methylphenyl ester of the formula

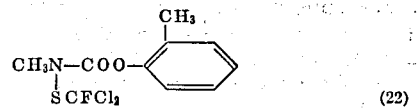 (22)

11. Compound according to claim 1 wherein such compound is N-(fluorodichloromethylthio)-N-methylcarbamic acid 3,5-dimethyl-4-methylmercaptophenyl ester of the formula

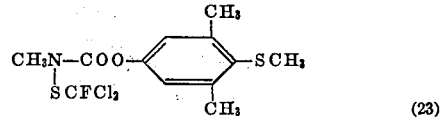 (23)

12. Compound according to claim 1 wherein such compound is N-(fluorodichloromethylthio)-N-methylcarbamic acid 3-methyl-4-dimethylaminophenyl ester of the formula

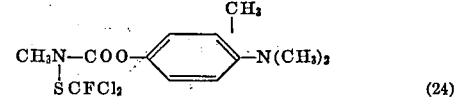 (24)

13. A process for the production of a N-sulfenylated N-methylcarbamic acid aryl ester, comprising reacting a N-sulfenylated N-methylcarbamic acid fluoride of the formula

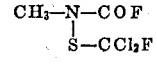

with a phenolic compound of the formula

ArOH

Ar represents a phenyl radical which may be substituted by at least one lower alkyl, alkoxy, alkylmercapto, dialkylamino, trifluoromethyl, halogen or nitro radical, in the presence of a diluent and an acid-binding agent.

References Cited

UNITED STATES PATENTS

| | | | |
|---|---|---|---|
| 3,344,153 | 9/1967 | Kuhle et al. | 260—479 |
| 3,326,967 | 6/1967 | Ratz et al. | 260—479 |

FOREIGN PATENTS

| | | |
|---|---|---|
| 1,493,581 | 7/1967 | France. |

JAMES A. PATTEN, Primary Examiner

U.S. Cl. X.R.

424—300

UNITED STATES PATENT OFFICE
CERTIFICATE OF CORRECTION

Patent No. 3,819,684     Dated June 25, 1974

Inventor(s) ENGELBERT KUHLE ET AL.     (page 1 of 2)

It is certified that error appears in the above-identified patent and that said Letters Patent are hereby corrected as shown below:

Col. 3, line 25, correct spelling of "<u>maritimus</u>".

Col. 5, line 48, correct spelling of "outstanding".

Col. 9, line 36, after "After" insert -- the specified periods of time, the degree of --.

Col. 11, lines 67 & 68, Table 5, Compound (C), in the last column of the Table, cancel "$\frac{10}{8}$" and insert therefor -- $\frac{100}{80}$ --.

Col. 13, line 51, Table 6, Compound (4), in the last column of the Table, change "79" to -- 76 --.

Col. 15, line 8, in the heading of Table 7, "Temperature range:" should read as follows: -- 18-20°C --.

Col. 17, line 5, Table 8, in the heading of the second column of t Table, correct spelling of "Amount".

Col. 17, Table 8, change "(B)" for the second compound to -- (8) --

UNITED STATES PATENT OFFICE
CERTIFICATE OF CORRECTION

Patent No. 3,819,684          Dated

Inventor(s) Engelbert Kuhle et al.          (page 2 of 2)

It is certified that error appears in the above-identified patent and that said Letters Patent are hereby corrected as shown below:

Col. 21, Table 10, Compound (19), in the formula, change " $\overset{|}{S}CFcl_2$ " to -- $\overset{|}{S}CFCl_2$ --.

Col. 27, line 48, before "-methylcarbamic" insert -- -N --.

Signed and sealed this 3rd day of December 1974.

(SEAL)
Attest:

McCOY M. GIBSON JR.
Attesting Officer

C. MARSHALL DANN
Commissioner of Patents